United States Patent [19]

Hattori et al.

[11] Patent Number: 4,683,996
[45] Date of Patent: Aug. 4, 1987

[54] METHOD OF CONTROLLING AUTOMATIC TRANSMISSION

[75] Inventors: Toshihiro Hattori, Ayase; Nobuichi Uchiyama, Fujisawa; Yasuyoshi Asagi, Kawasaki; Noriaki Ogawa, Tokyo; Hitoshi Kasai, Kawasaki, all of Japan

[73] Assignees: Isuzu Motors Limited, Tokyo; Fujitsu Limited, Kawasaki, both of Japan

[21] Appl. No.: 685,556

[22] Filed: Dec. 24, 1984

[51] Int. Cl.⁴ .................. F16D 23/10; F16D 21/04
[52] U.S. Cl. ........................ 192/0.033; 192/0.073; 192/0.09
[58] Field of Search ............ 192/0.033, 0.032, 0.076, 192/0.075, 0.073, 0.09, 3.58

[56] References Cited

U.S. PATENT DOCUMENTS

| | | | |
|---|---|---|---|
| 3,548,980 | 12/1970 | Schmidt | 192/3.58 X |
| 3,756,358 | 9/1973 | Espenschied et al. | 192/0.09 |
| 3,834,499 | 10/1974 | Candellero et al. | 192/0.033 X |
| 4,061,217 | 12/1977 | Toyota et al. | 192/0.076 X |
| 4,172,505 | 10/1979 | Rabus et al. | 192/0.076 X |
| 4,289,222 | 9/1981 | Esthimer | 192/0.076 X |
| 4,344,513 | 8/1982 | Etienne | 192/0.052 X |
| 4,361,060 | 11/1982 | Smyth | 74/752 A |

Primary Examiner—Lawrence Staab
Assistant Examiner—Martin G. Belisario
Attorney, Agent, or Firm—Staas & Halsey

[57] ABSTRACT

A method of controlling a synchromesh type automatic transmission of a vehicle such as an automobile, including the steps of releasing a clutch for connecting an engine and the transmission in response to a speed change command, shifting the transmission from one speed position to a neutral position, shifting the transmission from the neutral position to a subsequent speed position, and applying the clutch. The double-clutching operation is conducted if a load upon synchronization during the speed changing operation exceeds a predetermined level, to once apply the clutch and subsequently release the clutch again while the transmission is in the neutral position. Thus, the synchronization load can be dropped to prevent any so-called "under-synchronization" in the transmission. The synchronization load is detected in terms of the difference between the r.p.m. of the input shaft of the transmission and the product of the vehicle speed or the r.p.m. of the output shaft of the transmission and the reduction ratio.

8 Claims, 5 Drawing Figures

METHOD OF CONTROLLING AUTOMATIC TRANSMISSION

BACKGROUND OF THE INVENTION

1. Field of the Invention

The present invention relates to a method of controlling the speed changing operations of a synchromesh type automatic transmission and, more particularly, to a method of ensuring the smooth changing operations of the synchromesh type automatic transmission even if a load on the transmission upon synchronization during the speed changing operations is high.

2. Description of the Prior Art

In recent years, automatic transmissions have been extensively used with vehicles. One type of automatic transmissions, which has an inertia lock type synchronizer conventionally used with a manual transmission, i.e., a so-called "synchromesh type transmission," has its automatic speed changing operations controlled by the use of a hydraulic transmission actuator and an electronic control unit.

For these automatic speed changing operations, it is necessary to release a clutch to disconnect an engine and the transmission. While the clutch is being released, the driving force of the engine is not transmitted to the drive wheel or wheels of the vehicle so that the vehicle runs for a period by its own inertia. As the period while the clutch is disengaged continues, the driver may sense the powerless running state of his vehicle and may feel uncomfortable during the drive. In order to eliminate this uncomfortable feeling, it is necessary to shorten the period for which the clutch is released by performing the speed changing operations as soon as possible.

In order to shorten the speed changing operations, it is possible to design the transmission actuator so that it operates for a short time period. For this design, it is sufficient to increase the actuating force and shorten the operating period of the transmission actuator. If this actuator thus constructed has a strong operating force and a short operating period, however, there arises a problem that so-called "under-synchronization" occurs, making the gears noisy if the difference in the revolutions per minute (i.e., the r.p.m.) between speed positions before and after shifting, i.e., a load upon synchronization is large, as in skip-shifting (e.g., from second to fourth speeds).

In order to solve that problem, it is sufficient to use an actuator which can control the operating force and period in a variable manner in dependence upon the magnitude of the synchronization load. Despite this fact, an actuator designed to have a variable operating force is disadvantageous in that it is complicated, thus raising its production cost and requiring more space.

SUMMARY OF THE INVENTION

It is, therefore, an object of the present invention to provide a method of controlling the speed changing operations of a synchromesh type automatic transmission of a vehicle to set a driver free of feeling uncomfortable while he is driving the vehicle.

Another object of the present invention is to provide a method of controlling the automatic transmission, which can prevent under-synchronization even under a high load, which might otherwise be exerted upon the synchronization, without the use of a variable operating force actuator.

Still another object of the present invention is to provide an automatic transmission controlling method which can ensure sufficient synchronization during shifting of the automatic transmission by reducing the synchronization load before the synchronizing operation.

A further object of the present invention is to provide an automatic transmission controlling method which enables the whole system of the automatic transmission to be constructed simply at a reasonable production cost without requiring an increased space, merely by using a simple actuator and an electronic control unit.

According to the present invention the synchronization load is dropped before each synchronization (or shifting), if it is detected to be excessive for the capacity of the synchronizer, by once applying the clutch, which has been released for one speed changing operation, and then releasing it again for the synchronization while the transmission is in a neutral position. In other words, according to the present invention, a so-called "double-clutching operation" is performed to drop the synchronization load before each synchronization.

According to a general feature of the present invention, there is provided a method of controlling a synchromesh type automatic transmission of a vehicle, comprising the steps of:

(a) releasing a clutch for connecting an engine and a transmission in response to a speed change command;
(b) shifting said transmission from one speed position to a neutral position;
(c) shifting said transmission from said neutral position to a subsequent speed position;
(d) applying said clutch; and
(e) detecting the level of a load upon synchronization during the speed changing operation, and applying said clutch and subsequently releasing said clutch while said automatic transmission is in said neutral position if said synchronization load exceeds a predetermined value so that said synchronization load may be dropped to prevent any undersynchronization in said automatic transmission.

According to another feature of the present invention, there is provided an automatic transmission controlling method, wherein step (e) further comprises the sub-steps of:

(i) multiplying a first value corresponding to the speed of said vehicle by a constant corresponding to the reduction ratio of said subsequent speed position, and computing a difference between the multiplied product and a second value corresponding to the speed of said engine;
(ii) comparing said difference and a predetermined value of said synchronization load;
(iii) applying said clutch after step (b) if said difference is not smaller than said predetermined synchronization load value; and
(iv) releasing said clutch after step (iii) and before step (c).

BRIEF DESCRIPTION OF THE DRAWINGS

Other objects, features and advantages of the present invention will become apparent from the following description taken in conjunction with the accompanying drawings, in which.

DESCRIPTION OF THE PREFERRED EMBODIMENT

Figure 1:
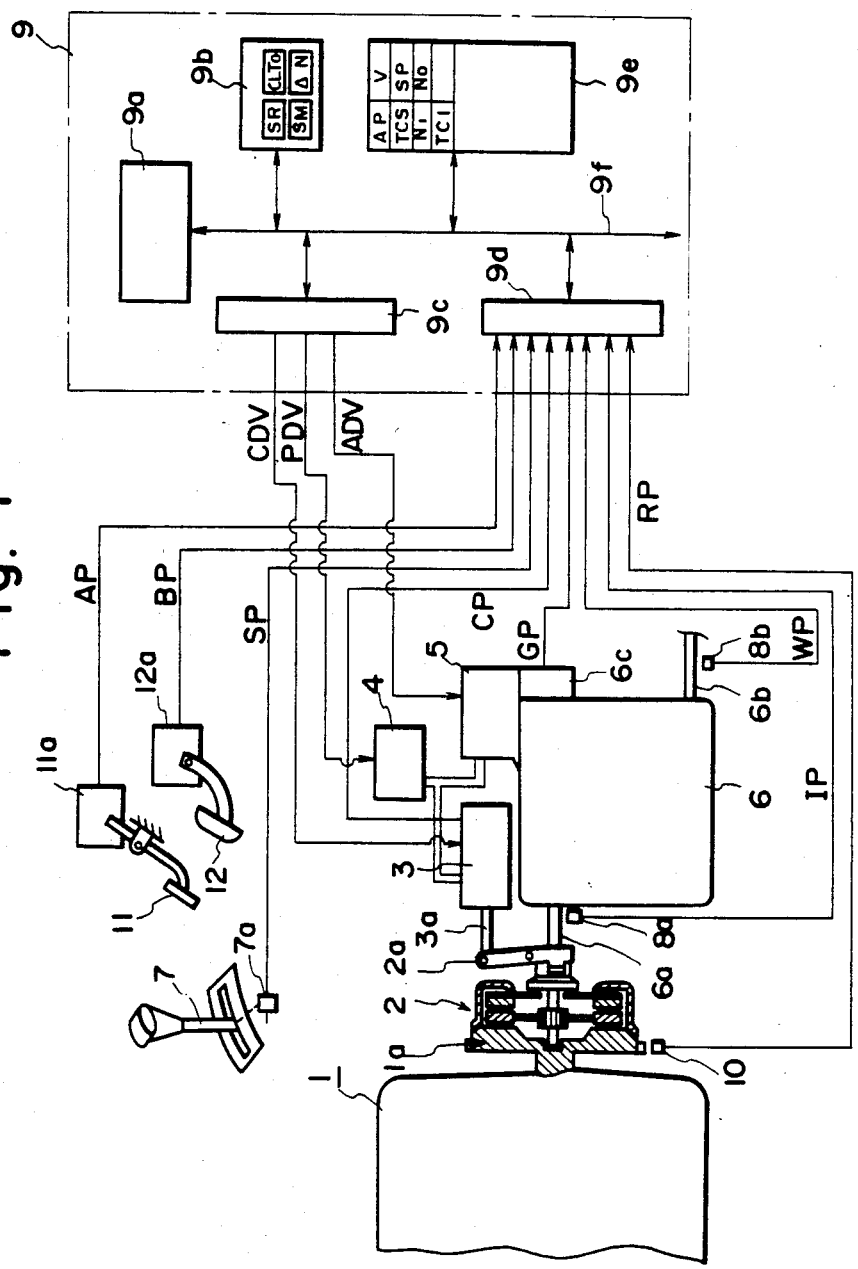
FIG. 1 is a block diagram showing a synchromesh type automatic transmission to be controlled by a method according to one embodiment of the present invention.

In FIG. 1 showing a synchromesh automatic transmission to be controlled by the method of the present invention, reference numeral 1 indicates an engine which is equipped with both a throttle valve for controlling the flow rate of an intake gas (such as air or an air-fuel mixture) and a flywheel 1a. Indicated at numeral 2 is a clutch body which is constructed of friction elements of the known type and equipped with a release lever 2a. Indicated at numeral 3 is a clutch actuator which has a piston rod 3a adapted to drive the release lever 2a so as to control the extent of engagement of the clutch body 2. Numerals 4 and 5 indicate a hydraulic system and a transmission actuator, respectively, which will be described below. Indicated at numeral 6 is a synchromesh type automatic transmission which is driven by the transmission actuator 5 to conduct the speed changing operations. The automatic transmission 6 is equipped with an input shaft 6a connected to the clutch 2, an output shaft (or a drive shaft) 6b, and a gear position sensor 6c for detecting a speed position (or a gear position). Indicated at numeral 7 is a selector lever which is manipulated by a driver to select an "N" range (i.e., a neutral position), a "D" range (i.e., an automatic speed changing position), a "1st" range (i.e., a first speed), a "2nd" range (i.e., a second speed), a "3rd" range (i.e., an automatic speed changing position among the first, second and third speeds), or an "R" range (i.e., a reverse position) in accordance with the position of the selector lever 7. A selected position signal SP indicating a selected range is outputted from a select sensor 7a. Indicated at numeral 8a is a revolution sensor for detecting the r.p.m. of the input shaft 6a. Indicated at numeral 8b is a vehicle speed sensor for detecting the vehicle speed in terms of the r.p.m. of the drive shaft 6b. Indicated at numeral 10 is an engine revolution sensor for detecting the r.p.m. of the engine 1 in terms of the r.p.m. of the flywheel 1a. Generally indicated at numeral 9 is an electronic control unit which is constructed of a micro computer. This electronic control unit 9 comprises the following: a processor 9a for arithmetic processings; a read only memory (referred to as a "ROM") 9b for storing a control program for controlling the automatic transmission 6 and the clutch 3; an output port 9c; an input port 9d; a random access memory (referred to as a "RAM") 9e for storing the computed results; and an address data bus (referred to as a "BUS") 9f connecting the foregoing components. The output port 9c is connected with the clutch actuator 3, the hydraulic system 4 and the transmission actuator 5 and outputting drive signals CDV, PDV and ADV, respectively. The input port 9d is connected with and receives signals from the various sensors 6c, 7a, 8a, 8b and 10, an accelerator pedal 11 and a brake pedal 12.

The accelerator pedal 11 is equipped with a sensor (i.e., a potentiometer) 11a for generating a signal AP indicating the extent or depth of depression of the accelerator pedal 11. The brake pedal 12 is equipped with a sensor 12a for generating a signal BP indicating the extent or depth of depression of the brake pedal 12.

Figure 2:
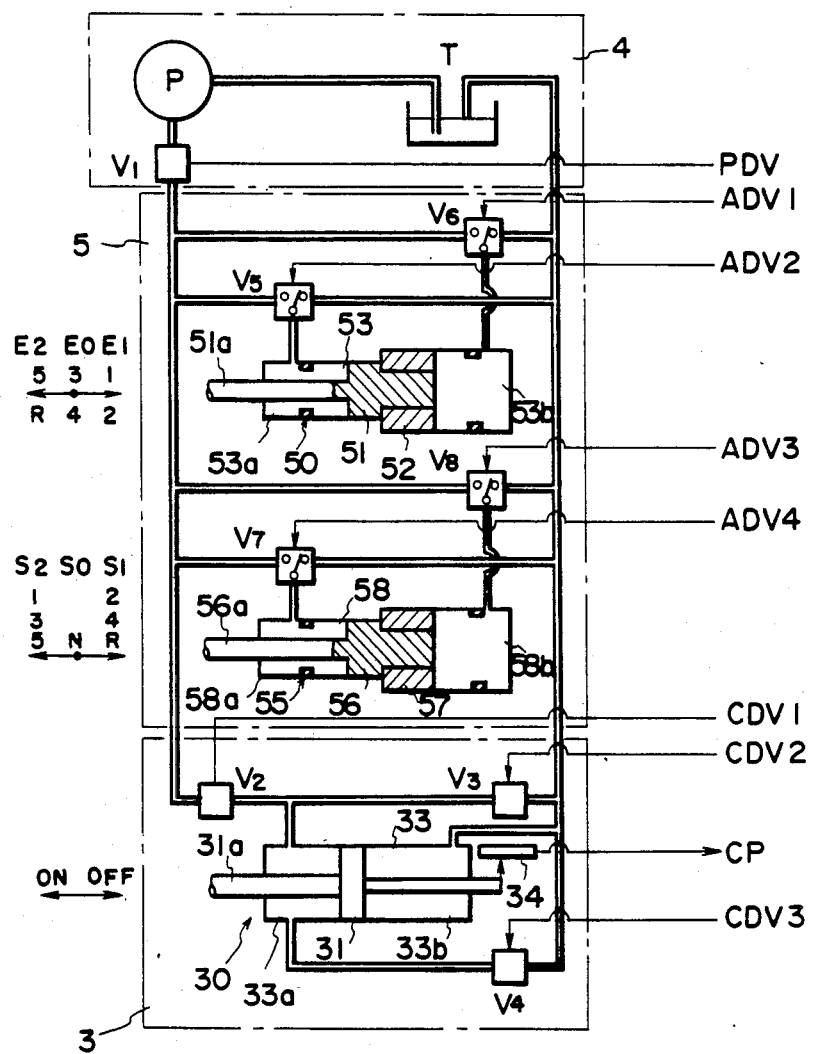
FIG. 2 is a schematic diagram showing the construction of an actuator to be used with the automatic transmission of FIG. 1.

FIG. 2 shows the constructions of the clutch, the transmission actuator and the hydraulic system 3, 5 and 4. In FIG. 2, reference letters T, P and $V_1$ indicate a tank, an oil pump and an on-off valve, respectively, which constitute the hydraulic system 4.

The clutch actuator 3 is composed of a cylinder 33, a piston 31 and a piston rod 31a (or 3a) having one end connected to the piston 31 and the other end connected to the release lever 2a of the clutch 2. The actuator 3 has a chamber 33a communicating with the pump P through on-off valves $V_1$ and $V_2$ and with the tank T through on-off valve $V_3$ and a pulse-controlled on-off valve $V_4$. The other chamber 33b of the actuator 3 communicates with the tank T at all times. Incidentally, reference numeral 34 indicates a position sensor for detecting the position of the piston rod 31a to output the extent of engagement of the clutch 2.

To release (or turn off) the clutch 2 the on-off valve $V_2$ is opened in response to a drive signal CDV1, and oil pressure is applied to the chamber 33a so that the piston 31 is moved to the right, as viewed in FIG. 2. When the on-off valves $V_3$ and $V_4$ are opened in response to drive signals CDV2 and CDV3, respectively, the oil pressure of the chamber 33a is released so that the piston 31 is moved to the left apply (or turn on) the clutch 2. In this operation, the clutch 2 is gradually applied because the on-off valve $V_4$ is pulse-driven in response to the drive signal CDV3.

The transmission actuator 5 is composed of a select actuator 50 and a shift actuator 55. These select and shift actuators 50 and 55 are constructed to take three positions and are composed, respectively, of stepped cylinders 53 and 58, first pistons 51 and 56, and second pistons 52 and 57 fitted on the corresponding first pistons 51 and 56. These first pistons 51 and 56 have their rods 51a and 56a, respectively engaging with internal levers (not shown) of the transmission 6. The actuators 50 and 55 are in the shown neutral states when an oil pressure is exerted upon both chambers 53a and 53b, and 58a and 58b of the respective stepped cylinders 53 and 58. When oil pressure is applied to the respective chambers 53a and 58a, the first pistons 51 and 56 are moved to the right, as shown in FIG. 2, together with the second pistons 52 and 57. When oil pressure is applied to the respective chambers 53b and 58b, only the first pistons 51 and 56 are moved to the left.

The chambers 53a and 53b of the select actuator 50 communicate through change-over valves $V_5$ and $V_6$, respectively, with the pump P (through the on-off valve $V_1$) or the tank T. On the other hand, the chambers 58a and 58b of the shift actuator 55 are made to communicate through change-over valves $V_7$ and $V_8$, respectively, with the pump P (through the on-off valve $V_1$) or with the tank T. As shown, the transmission 6 is in the neutral position. When the change-over valve $V_7$ connects chamber 58a with the pump P in response to a drive signal ADV4 change-over valve $V_8$ connects chamber 58b with tank T in response to a drive signal ADV3, the transmission 6 establishes the fourth speed. When a speed change signal from the fourth speed to the fifth speed is generated, the change-over valves $V_8$ and $V_7$ connect chamber 58a and 58b with pump P in response to the drive signals ADV4 and ADV4 thereby returning the shift actuator 55 to the neutral state. Then, the connection of the change-over valve $V_6$ is switched to the pump P in response to a drive signal ADV1 and the connection of the change-over valve $V_5$ is switched to the tank T so that the select actuator 50 is shifted to a 5th-speed—reverse select position. Then, the change-over valve $V_8$ has its connection switched to the pump P in response to the drive signal ADV3 and the change-over valve $V_7$ has its connection switched to the tank T so that the shift actuator 55 is shifted to a 5th-speed position, thereby changing the speed of the transmission 6 to the 5th speed.

Thus, the speed changing operations to the respective speeds can be performed by switching the change-over valves $V_6$ and $V_5$, and $V_8$ and $V_7$ in response to the drive signals ADV1 and ADV2, and ADV3 and ADV4 to alternately operate the select actuator 50 and the shift actuator 55.

The operations of the embodiment shown in FIG. 1 will be described in the following.

(1) First of all, when the select lever 7 is manipulated to the "D" range so that the selected position signal SP of the "D" range is inputted from the position sensor 7a to the input port 9d, the processor 9a reads it through the BUS 9f to store it in the RAM 9e and outputs the drive signal ADV to the transmission actuator 5 from the output port 9c so that the actuator 5 is driven to shift the transmission 6 to the 1st speed.

(2) Next, the processor 9a receives a gear position signal GP from the gear position sensor f6c. This sensor 6c detects the positions of the internal levers, which engage with the select actuator 50 and the shift actuator 55 shown in FIG. 2, to generate as the position signal GP shift-side position signals $S_2$, $S_0$ and $S_1$ and selector-side position signals $E_2$, $E_0$ and $E_1$, as shown in FIG. 2. For example, in the case of the 1st speed, the detected signals $E_1$ and $S_2$ are outputted as the gear position signal GP. Upon reception of this position signal GP, the processor 9a detects that the transmission 6 is actually shifted to the 1st speed, and stores it as TCS in the RAM 9e.

Figure 4:
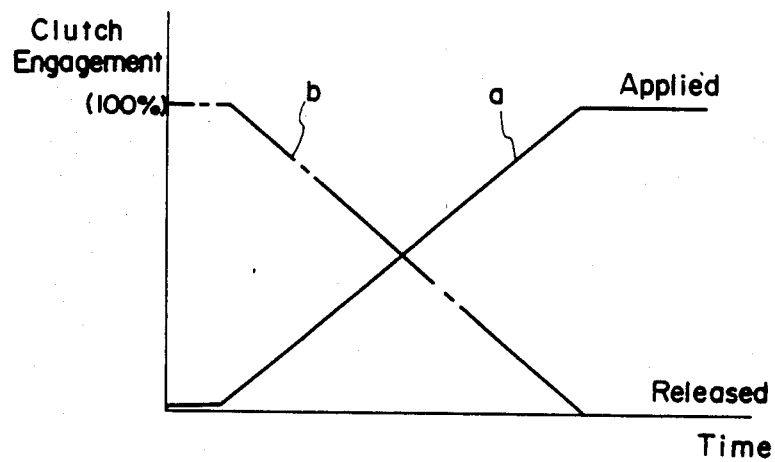
FIG. 4 is a diagram showing the operations of a clutch to be used with the automatic transmission of FIG. 1.

(3) Next, the processor 9a sends the clutch drive signal CDV, via the output port 9c, to the clutch actuator 3 so that this actuator 3 gradually moves the piston rod 3a to the left to gradually move the release lever 2a to the left. As result, as indicated by a curve a in FIG. 4, the clutch 2 has its percentage of engagement changed so that it is shifted from a released state through a partially applied state to an applied state. Thus, the vehicle is set in motion.

Figure 3:
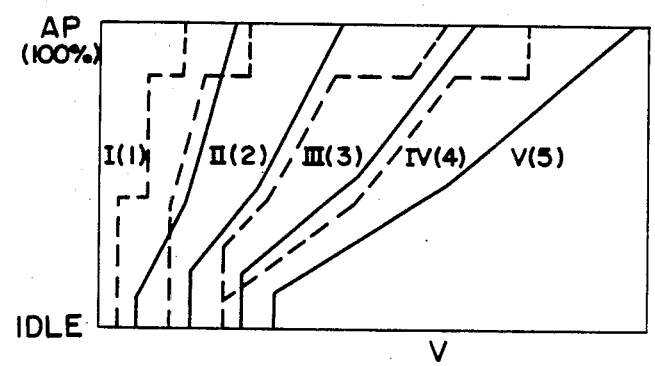
FIG. 3 is a diagram showing a shift map for shifting the automatic transmission of FIG. 1.

(4) Subsequently, the processor 9a periodically receives a detected speed signal (in the form of pulses) WP from the speed sensor 8b via the input port 9d and computes a vehicle speed V which is stored in the RAM 9e, and receives a depression AP of the accelerator pedal 11 from the sensor 11a via the input port 9d and stores it in the RAM 9e. Then, the processor 9a determines the speed position from a shift map SM corresponding to the vehicle speed V and the depression signal AP and stored as a part of the program of the ROM 9b. Specifically, the ROM 9b stores a shift map SM which corresponds to the vehicle speed V and the depression AP in the form of a table, as shown in FIG. 3. In this FIG. 3, the respective speed change positions are indicated by curves I, II, III, IV and V; the solid curves indicate boundaries for upshifting whereas the broken or dashed curves indicate boundaries for downshifting. Moreover, a subsequent speed position TC1 is determined from the depression AP and the vehicle speed V.

Figure 5:
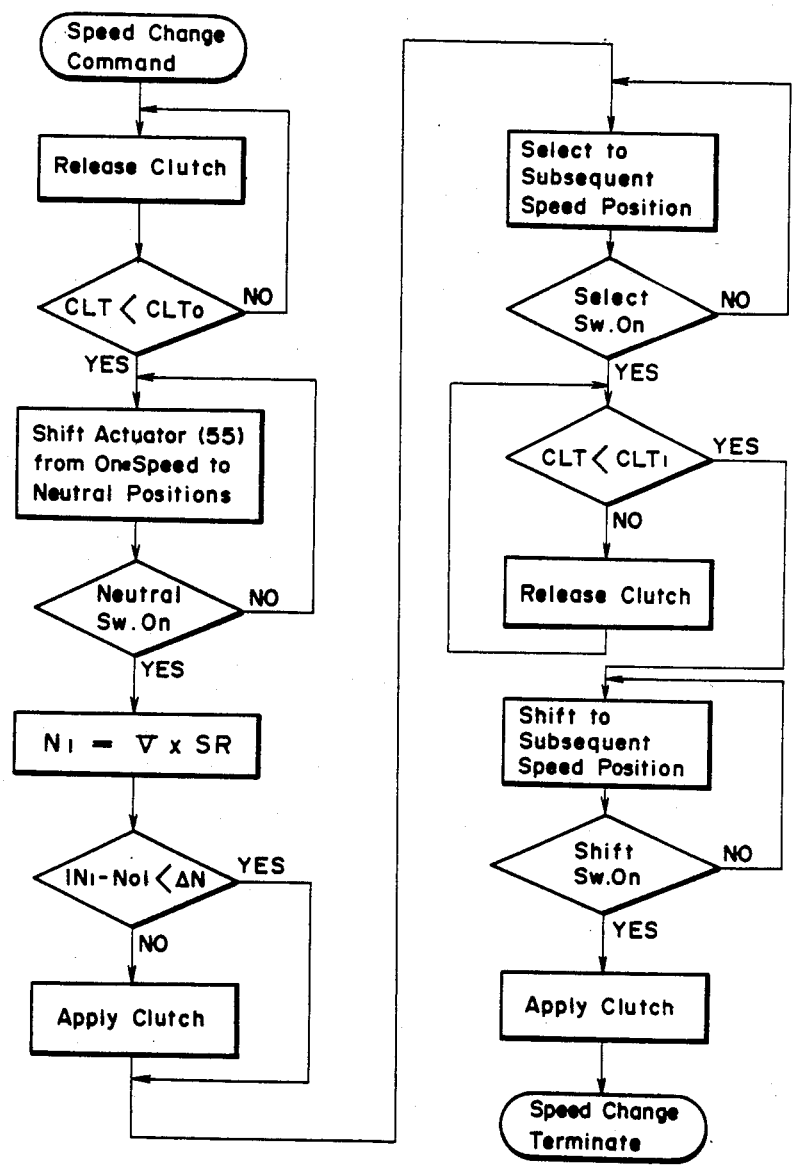
FIG. 5 is a flow chart showing the processing of the method according to the embodiment of the present invention.

(5) Next, the processor 9a compares the speed position TCS stored in the RAM 9e with its determined speed position. If the speed position TCS and the determined speed position are not identical, the process on 9a generates a signal ADV to start the process for shifting to the determined speed position. This processing will be described with reference to the processing flow chart of FIG. 5.

(6) The processor 9a sends the clutch drive signal CDV, when it recognizes a speed change command, to the clutch actuator 3 via the output port 9c. As a result, oil pressure is applied to the chamber 33a of the cylinder 33 of the clutch actuator 3 to return the piston rod 3a (or 31a) to the right, thereby returning the release lever 2a to the right so that the clutch 2 is gradually released, as indicated by a curve b of FIG. 4. Then, the processor 9a receives a position signal CP (or CLT) via the input port 9d from the position sensor 34 (as shown in FIG. 2) for detecting the position of the piston rod 31a of the clutch actuator 3 and compares the position signal CLT with a set position signal $CLT_0$ (which is stored in the ROM 9b). For $CLT_0$ CLT, the processor 9a detects that the clutch is released and interrupts the drive of the clutch actuator 3.

(7) Next, the processor 9a sends the drive signals ADV3 and ADV4 to the shift actuator 55 in the transmission acutator 5 via the output port 9c to bring the shift actuator 55 into a neutral position. As a result, the transmission 6 comes into a neutral state. The processor 9a detects that the transmission is in neutral when the gear position signal GP from the gear position sensor 6c is $S_0$.

(8) Next, the processor 9a reads out a reduction ratio SR, which corresponds to the determined speed position from the ROM 9b and executes the following computation with the vehicle speed v of the RAM 9e to determine the following value $N_1$:

$N_1 = V \times SR.$

The r.p.m. of the output shaft 6b may be determined from the detected pulses WP of the sensor 8b and used in place of the vehicle speed v the above Equation. And, the product $N_1$ thus determined is stored in the RAM 9e. At the same time, the processor 9a receives detected pulses IP from the revolution sensor 8a via the input port 9d to compute the r.p.m. $N_0$ of the input shaft 6a and stores it in the RAM 9e.

(9) Next, the processor 9a determines a synchronization load M by computing $|N_1 - N_0|$. Specifically, the processor reads out the product $N_1$ and the r.p.m. $N_0$ from the RAM 9e to determine the synchronization load M as the absolute value of the difference of $N_1$ and $N_0$.

Then, the processor 9a reads out a predetermined synchronization value $\Delta N$ stored in the RAM 9b and compares it with the synchronization load M. The predetermined synchronization load valve $\Delta N$ is set in accordance with the capacity of the synchronizer employed. As will be described below different synchronization load values $\Delta N$ are provided for each speed position. Further, the values of $\Delta N$ depend upon whether the speed change is an upshifting or downshifting operation. The processor 9a selects the optimum $\Delta N$ in accordance with the above-specified conditions.

(10) The processor 9a controls the clutch actuator 3 to apply the clutch 2 if it is determined that $M \geq \Delta N$, i.e., that the synchronization load is excessive. Specifically, the processor 9a sends the clutch drive signal CDV to the clutch actuator 3 via the output port 9c, as in step (3) to apply the clutch 2. As a result, the engine 1 and the transmission 6 are connected, but the transmission 6 is held in its neutral state. Therefore, the drive shaft (or the output shaft) 6b is not driven by the engine 1, but the synchronization load is reduced by that connection. The excessive synchronization load is liable to take place in case the speed changing operation is skipped as a result that the accelerator pedal is abruptly depressed while the vehicle is running.

(11) On the contrary, the processor 9a proceeds to a subsequent processing steps if it determined that $M < \Delta N$ as a result of the aforementioned comparison.

(12) Then, the processor 9a reads out the subsequent speed position $TC_1$ from the RAM 9e to drive the select actuator 50 of the transmission actuator 5, thereby effecting the selected drive gear for that speed position. Specifically, the processor sends the drive signals ADV1 and ADV2, via the output port 9c, to drive the select actuator 50, thereby effecting the selected drive of the transmission 6. If the subsequent speed position TC1 is, for example the 4th speed, the piston 51 is hydraulically controlled to come to a middle position of the cylinder 53. If the gear position sensor output the signal $E_0$ as the position signal GP, the processor 9a confirms the select position and interrupts the drive. Since, at this time, the shift actuator 55 is in the neutral position, the transmission 6 is left at the neutral position.

(13) Next, the processor 9a detects the position signal CLT of the position sensor 34 of the clutch actuator 3, via the input port 9d, and compares it with the set position signal $CLT_0$ (which is stored in the ROM 9b) indicating the clutch being released, to detect whether the clutch 2 is applied or released. If the compared result is $CLT \geq CLT_0$, the clutch 2 has been applied by the foregoing step (10) and the processor 9a executes the control to release the clutch 2 as in step (6). If $CLT < CLT_1$, the processor 9a proceeds to a subsequent processing because the clutch 2 is released.

(14) The processor 9a reads out the subsequent speed position TC1 from the RAM 9e to drive the shaft actuator 55 of the transmission actuator 5, thereby effecting the shift drive for the speed position. Specifically, the processor 9a sends out the drive signals ADV3 and ADV4 via the output port 9c to drive the shift actuator 55, thereby effecting the drive of the transmission 6. If the subsequent speed position TC1 is, for example in the 4th speed, the piston 56 is hydraulically controlled to come to the righthand end of the cylinder 58. And, the processor 9a confirms the shift drive by detecting that the signal $S_1$ appears as the gear position signal GP inputted from the gear position sensor 6c via the input port 9d and interrupts the shift drive.

Since the select drive is already affected by the foregoing step (12), the transmission 6 is synchronously shifted to the 4th speed.

(15) The processor 9a drives the clutch actuator 3 by the control similar to that of the step (10) so as to apply the clutch 2.

Then, the processor 9a replaces the speed position TCS stored in the RAM 9e with the subsequent speed position TC1, thus terminating the speed changing operations.

In short, according to the present invention, the steps (8), (9), (10), (11) and (13) are added to the conventional speed changing steps. In accordance with the pesent invention, if the synchronization load is excessive, the synchronization is conducted in the neutral state by once applying the clutch to drop the synchronization load and by subsequently releasing the clutch.

As discussed above, the synchronization load value $\Delta N$ is set for each speed position, as enumerated in the following Table, because the synchronizer has different capacities for the respective speed positions:

| Subsequent Speed Position | Upshifting | Downshifting* |
|---|---|---|
| 1st Speed | | 1,446 |
| 2nd Speed | 2,365 | 1,226 |
| 3rd Speed | 2,773 | 2,439 |
| 4th Speed | 1,920 | 1,689 |
| 5th Speed | 1,548 | |

*The downshifting values are measured at the clutch discs and converted into the r.p.m. values of the engine.

Moreover, the set synchronization load values $\Delta N$ are different depending whether the speed changing operation is upshifting or downshifting. Therefore, those values $\Delta N$ are prepared for the upshifting and downshifting of each speed position and are stored in the ROM 9b in advance.

The r.p.m. of the input shaft referred to in the step (8) is detected in terms of the pulses IP from the revolution sensor 8a of the input shaft 6a of the transmission 6, but may also be detected from the clutch discs of the clutch 2 in terms of detected pulses RP.

As has been described above, in accordance with the present invention, the synchronization load during the speed changing operations is detected so that the synchronization is conducted, if the synchronization load detected exceeds the set value, by once applying the released clutch and by subsequently releasing the clutch again before the synchronization while the transmission is in the neutral state. This so-called "double-clutching operation", allows the present invention to enjoy an effect that the synchronization can be conducted after the synchronization load is reduced. Thus, the method of the present invention can prevent the under-synchronization in the synchromesh type automatic transmission.

According to the present invention, moreover, the synchronization load is detected in terms of the difference between the r.p.m. of the input shaft of the transmission and the product of the vehicle speed or the r.p.m. of the output shaft and the reduction ratio. As a result, the present invention can enjoy another effect that the detection of the synchronization load can be performed easily and promptly.

Although the present invention has been described hereinbefore in connection with one embodiment, it can be modified in various manners within the gist of the invention and should not exclude modifications.

What is claimed is:

1. A method of controlling a synchromesh type automatic transmission in a vehicle having an engine and a clutch, comprising the steps of:

(a) releasing the clutch in response to a speed change command;

(b) shifting the transmission from a former speed position to neutral;

(c) multiplying a first value corresponding to the speed of the vehicle by a reduction ratio corresponding to a subsequent speed position;

(d) detecting a synchronization load in accordance with the difference between the product of the first value and the reduction ratio and a second value corresponding to the r.p.m. of the engine;

(e) comparing the detected synchronization load with a predetermined synchronization load, and controlling the r.p.m. of the input shaft of the transmission by engaging the clutch while the transmission is in neutral until the detected synchronization load is less than the predetermined synchronization load and then releasing the clutch;

(f) shifting said transmission from neutral to a subsequent speed position; and (g) applying said clutch.

2. An automatic transmission controlling method according to claim 1, wherein said step (c) includes detecting the first value in terms of the r.p.m. of the output shaft of said automatic transmission.

3. An automatic transmission controlling method according to claim 1, wherein said step (d) includes detecting the second value in terms of the r.p.m. of the output shaft of said engine.

4. An automatic transmission controlling method according to claim 1, wherein said step (e) includes selecting a predetermined synchronization load value corresponding to the subsequent speed position from a plurality of predetermined synchronization load values corresponding to respective ones of the speed positions.

5. A method of performing a shifting operation in a synchromesh automatic transmission in a vehicle having an engine and a clutch, comprising the steps of:

(a) releasing the clutch in response to a speed change command;

(b) shifting the transmission from a former speed position to neutral;

(c) detecting a synchronization load, while the transmission is in neutral, in accordance with the difference between (i) the product of a first value corresponding to the speed of the vehicle and a reduction ratio corresponding to a subsequent speed position and (ii) a second value corresponding to the speed of the engine;

(d) comparing the detected synchronization load with a predetermined synchronization load;

(e) applying the clutch while the transmission is in neutral if the detected synchronization load exceeds the predetermined synchronization load;

(f) releasing the clutch if the clutch is applied in step (e);

(g) shifting the transmission to the subsequent speed position; and (h) applying the clutch.

6. A method according to claim 5, wherein said step (c) includes determining the first value in terms of the r.p.m. of an output shaft of the transmission and determining the second value in terms of the r.p.m. of an input shaft of the transmission.

7. A method according to claim 5, wherein said step (d) includes selecting a predetermined synchronization load corresponding to the subsequent speed position from a plurality of predetermined synchronization loads corresponding to respective ones of the speed positions and corresponding to upshifting and downshifting operations.

8. A method of performing a shifting operation in synchromesh automatic transmission in a vehicle having an engine and a clutch, comprising the steps of:

(a) releasing the clutch;

(b) shifting the transmission to neutral;

(c) detecting a synchronization load, while the transmission is in neutral, in accordance with the difference between (i) the product of a first value corresponding to the speed of the vehicle and a reduction ratio corresponding to a subsequent speed position and (ii) a second value corresponding to the speed of the engine;

(d) reducing the synchronization load by applying the clutch and releasing the clutch while the transmission is in neutral, if the synchronization exceeds a predetermined synchronization load;

(e) shifting the transmission to the subsequent speed position; and (f) applying the clutch.

* * * * *

UNITED STATES PATENT AND TRADEMARK OFFICE
CERTIFICATE OF CORRECTION

PATENT NO. : 4,683,996

DATED : August 4, 1987

INVENTOR(S) : Hattori et al.

It is certified that error appears in the above-identified patent and that said Letters Patent is hereby corrected as shown below:

[57] ABSTRACT, line 6, after "position," (second occurrence) insert --performing a "so-called" double-clutching operation,--.

Col. 4, line 31, "leftapply" should be --left to apply--.

Col. 5, line 1, "ADV4" (first occurrence) should be --ADV3--; "ADV4" (second occurrence) should be --ADV4,--;
line 31, "f6c" should be --6c--.

Col. 6, line 26, "$CLT_0CLT$" should be --$CLT_0 < CLT$--;
line 46, "v" should be --V--.

Col. 7, line 31, "output" should be --outputs--;
line 63, "affected" should be --effected--.

Signed and Sealed this

Second Day of February, 1988

Attest:

DONALD J. QUIGG

Attesting Officer

Commissioner of Patents and Trademarks